May 15, 1928.

K. SCHNEIDER

VALVE

Filed Dec. 22, 1925   2 Sheets-Sheet 1

1,669,424

Witnesses:
A. F. K. Stephan
Annie Stephan

Inventor:
Karl Schneider.

May 15, 1928.

K. SCHNEIDER

VALVE

Filed Dec. 22, 1925    2 Sheets-Sheet 2

Witnesses:
A. F. R. Stephan
Annie Stephan

Inventor:
Karl Schneider.

Patented May 15, 1928.

1,669,424

UNITED STATES PATENT OFFICE.

KARL SCHNEIDER, OF MULHEIM-RUHR, GERMANY, ASSIGNOR TO THE FIRM OF: THYSSEN & CO., AKTIENGESELLSCHAFT, OF MULHEIM-RUHR, GERMANY.

VALVE.

Application filed December 22, 1925, Serial No. 77,091, and in Germany May 14, 1925.

Hitherto valves for pumps, blowers, compressors, piston-engines and the like, have become known, of which the valve-plate is supported and guided by springs, spring arms, or the like, at one side thereof. Owing to this one-sided springy support only, that the center of gravity of the valve-plate, with an inclined or perpendicular position of the valves in the machine, lies during the stroke always or at least temporarily beyond its supporting points, so that the valve-plate tends to take-up inclined position with reference to its seat. Furthermore, also with positively guided valve-plates the inclined position of the valve-plates with reference to its seat due to friction during the stroke, cannot be avoided. Said inclined position of the valve-plate results in an increase of the pressure losses during the opening and closing of the valves, and furthermore in a one-sided striking of the valve-plate upon its seat or its guard respectively, whereby frequent breakages of the valve-plates and thus working disturbances are produced.

According to the present invention, said drawbacks are avoided by the valve-plate being, not as hitherto supported by springs, springy arms, or the like, at one side thereof only but, at both sides; so carried and guided by one or a plurality of resilient members, such as springs, corrugated tubelike diaphragms, or the like, firmly connected therewith that the center of gravity of the valve-plate lies permanently within its two or more supporting points, even during the movements of the valve-plate. The resilient support can also be attained by bending-up cut-out portions of the valve-plate itself in springlike fashion or by turning it out of a thickened part of the valve-plate in springlike manner.

By these means, an exact parallel and frictionless guiding of the valve-plate with reference to its seat and to its guard respectively is attained.

The accompanying drawings illustrate various constructional forms of the subject matter of the present invention.

Figure 1:
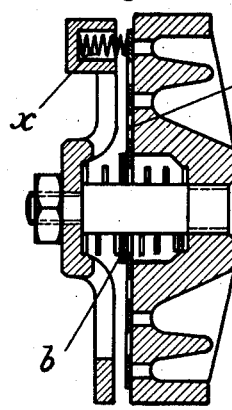
Figs. 1 and 2 are respectively a cross-section and a plan view of a ring valve, in which the valve-plate is supported by a central spring.
Figure 2:
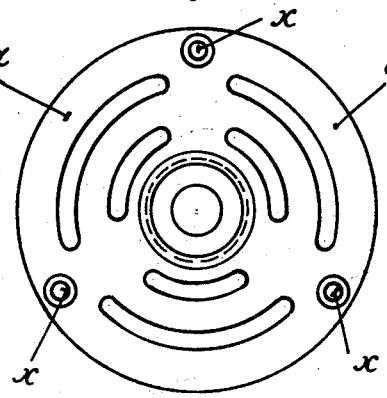
Figure 8:
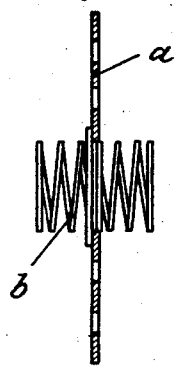
Fig. 8 shows how the valve-plate can be connected with the resilient-support.

As shown in Figs. 1 and 2, the valve-plate $a$ is here centrally supported and guided by a spring $b$ which is in firm connection therewith and conveniently guided at its ends in the valve-seat and in the valve-guard. Preferably, said spring is of rectangular cross-section to impart thereto a favourable lateral strength. The attachment and supporting of the valve-plate is effected by means of two adjacent spring windings placed directly upon one another and of which one is of larger diameter than the other, the valve-plate embracing with a corresponding boring therein the smaller spring winding and bearing tightly against the larger one, or it can be fixed to the latter (see Fig. 8). The valve-plate $a$ is thus centrally guided by the spring $b$ and maintains its parallel position with reference to its seat in all its movements and positions.

Figure 3:
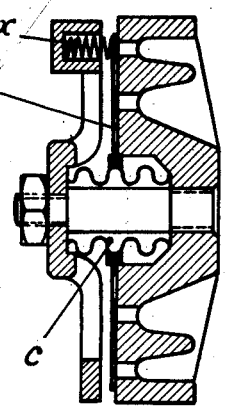
Fig. 3 is a similar view to that shown in Fig. 1, the spring being here replaced by a corrugated tube-like diaphragm.

As shown in Fig. 3, the central spring of high lateral strength can be replaced by any other resilient support, for instance a corrugated tubelike diaphragm $c$, or the like, in firm connection with the valve-plate.

Figure 4:
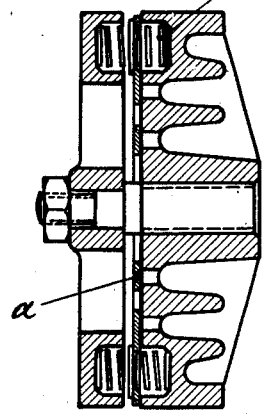
Figs. 4 and 5 are similar views to those shown in Figs. 1 and 2; the resilient support of the valve-plate being here located near the outer circumference of the valve and uniformly distributed over the same.
Figure 5:
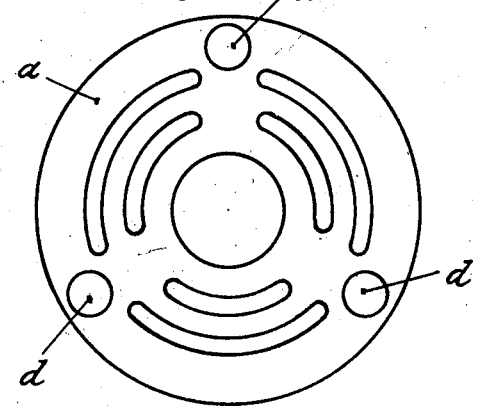

As shown in Figs. 4 and 5, the central resilient support of the valve-plate is here replaced by a plurality of resilient supports $d$ located near the circumference of the plate and uniformly distributed over the same and in firm connection therewith. Obviously, said supports can also be so located that they embrace the outer circumference of the valve-plate $a$, this being understood without further illustration.

Figure 6:
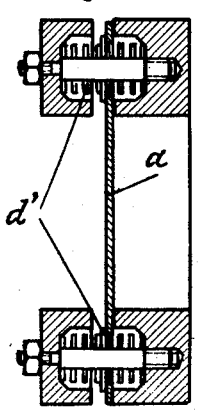
Figs. 6 and 7 are similar views to those shown in Figs. 4 and 5, the valve-plate consisting here of several single strips.
Figure 7:
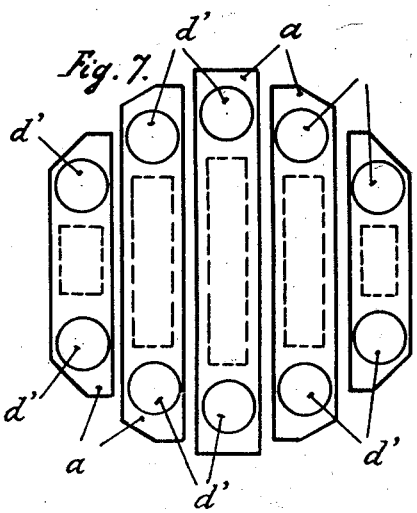

Figs. 6 and 7 show a valve-plate consisting of several single strips, each of which is fitted at its ends with resilient supports $d'$ in firm connection therewith.

Figure 9:
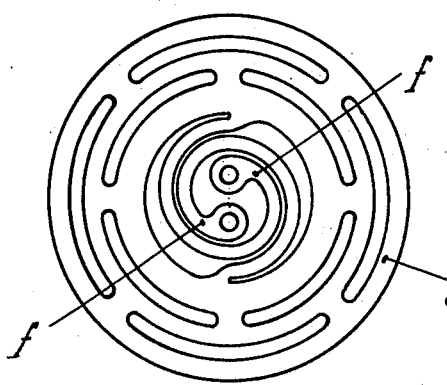
Figs. 9 and 10 are respectively a plan view and a side view of a valve-plate, with its resilient support, the latter being here formed of cut-out portions of the plate itself bent-up in springlike fashion.
Figure 10:
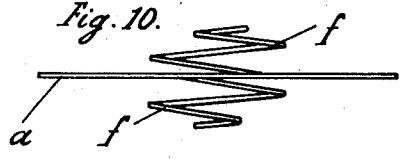

In Figs. 9 and 10, the resilient support of the valve-plate is formed by tongues $f$ cut-out of the plate itself and bent-up in springlike fashion; any separate fastening means for the resilient support being here superfluous.

Figure 11:
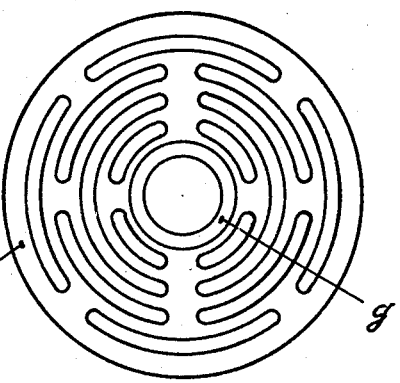
Figs. 11 and 12 are similar views to those shown in Figs. 9 and 10, the resilient support being here two-parted and the valve-plate fixed between said two parts.
Figure 12:
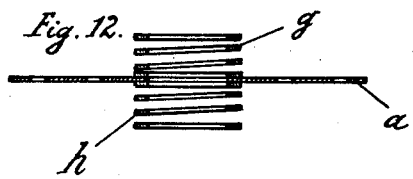

In Figs. 11 and 12, the resilient support $g$, $h$ is two-parted and the valve-plate $a$ is fixed between said two parts in any appropriate manner.

Figure 13:
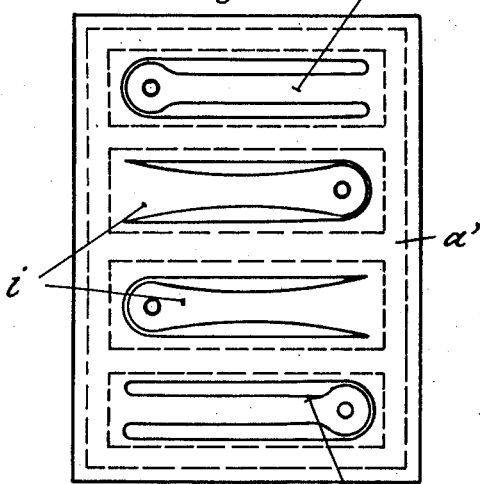
Figs. 13 and 14 are similar views to those shown in Figs. 9 and 10, the valve-plate being here of rectangular shape while the resilient support is also formed of cut-out portions of the plate itself bent-up in springlike fashion.
Figure 14:
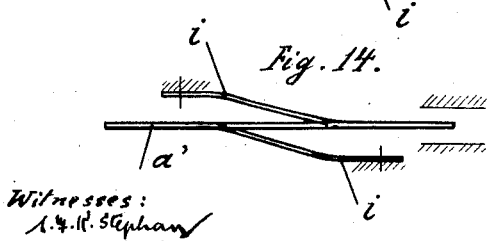

Figs. 13 and 14 illustrate a rectangular valve-plate $a'$, of which straight tongues $i$ are cut-out and bent-up in springlike fashion in alternate directions; Fig. 14 indicating the extent of the valve stroke which corresponds to the distance of said springy tongues $i$ from the valve-plate $a'$, the valve stroke being thus bounded by said distance.

The distance between the supporting points of each two adjacent springy supports $i$ is preferably so chosen that at said supporting points, which are located in the seat and in the counter-bearing of the valve-plate respectively, no movement occurs even if the springy supports $i$ bear loosely only upon said supporting points and are not rigidly attached thereto by screws, rivets or the like.

With a smaller distance between said supporting points, however, said attachment must be rigid.

Figure 15:
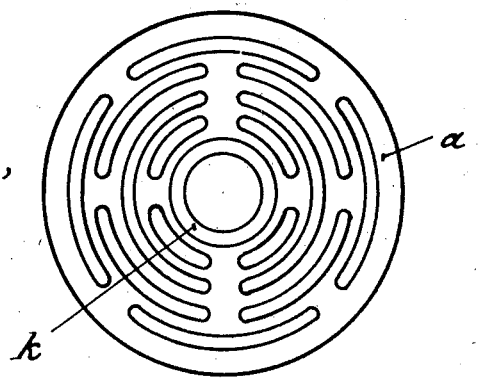
Figs. 15 and 16 are similar views to those shown in Figs. 9 and 10, the resilient support being here turned out of a thickened part of the valve-plate in springlike manner.
Figure 16:
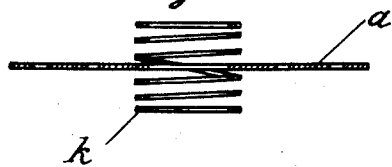

Figs. 15 and 16 show how the resilient support $k$ is turned-out of a thickened part of the valve-plate $a$ in springlike manner, the plate being thus also integral with its resilient support.

In all the examples of resilient supports illustrated and described, besides which other examples are possible within the scope of the present invention, a frictionless and exact parallel guiding of the valve-plate, with reference to its seat and to its guard in all its movements and positions is ensured; said resilient supports exerting besides a final closing action upon the valves.

The known additional springs $o$ (Figs. 1-3) at the outer circumference of the valve-plate are preferably maintained in connection with the subject matter of the present invention, in order, particularly with large valve-plates, to increase the closing action of the valves and to attain a uniform contact of the thin-walled valve-plates with their seats.

The improved valve suits all requirements of a proper working. The valve passage is hardly impeded by the insertion of the resilient supports which do not take much room, and the valve stroke can be of large extent, whereby the preliminary conditions for the construction of large high-speed machines are obtained. Furthermore, the hard striking of the valve-plate against its guard is smoothed by the insertion of the resilient support, and the disturbing breakages of the valve-plates are thereby avoided. The frictionless, almost unresisting guiding of the valve-plates results in a decrease of the opening resistances of the valve and thus of the power consumption required for the valve operation.

What I claim, is:

1. The combination, in a valve, with a valve-plate, its seat and its guard, of a resilient support for and in firm connection with both sides of said valve-plate intervening between said seat and said guard and adapted to ensure a frictionless and parallel guiding of said valve-plate with reference to its seat and guard respectively in all its movements and positions, substantially as set forth.

2. The combination, in a valve, with a valve-plate, its seat and its guard, of a resilient support for and in firm connection with both sides of said valve-plate intervening between said seat and said guard and adapted to ensure a frictionless and parallel guiding of said valve-plate with reference to its seat and guard respectively in all its movements and positions, said resilient support consisting of at least one spring, substantially as set forth.

3. A valve as specified in claim 1, in which said valve-plate is of rectangular shape and said resilient support is formed of straight tongues cut-out of said valve-plate and bent-up in springy fashion in alternate directions, the distance of said springy tongues from the valve-plate corresponding to and bounding the valve stroke, substantially as set forth.

In testimony whereof I have hereunto set my hand.

KARL SCHNEIDER.